United States Patent
Kim et al.

(10) Patent No.: US 11,124,446 B2
(45) Date of Patent: Sep. 21, 2021

(54) GLASS FRIT, GLASS COMPOSITION, COOKING APPLIANCE HAVING GLASS COMPOSITION, AND METHOD OF FORMING GLASS COMPOSITION

(71) Applicant: LG ELECTRONICS INC., Seoul (KR)

(72) Inventors: Namjin Kim, Seoul (KR); Youngseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 16/136,618

(22) Filed: Sep. 20, 2018

(65) Prior Publication Data

US 2019/0092680 A1    Mar. 28, 2019

(30) Foreign Application Priority Data

Sep. 26, 2017   (KR) ........................ 10-2017-0124098

(51) Int. Cl.
| | |
|---|---|
| *C03C 8/04* | (2006.01) |
| *C03C 3/066* | (2006.01) |
| *C03C 8/06* | (2006.01) |
| *C03C 3/093* | (2006.01) |
| *C03C 3/112* | (2006.01) |
| *F24C 15/00* | (2006.01) |

(52) U.S. Cl.
CPC ................ *C03C 8/04* (2013.01); *C03C 3/066* (2013.01); *C03C 3/093* (2013.01); *C03C 3/112* (2013.01); *C03C 8/06* (2013.01); *F24C 15/005* (2013.01); *C03C 2207/02* (2013.01); *C03C 2207/04* (2013.01)

(58) Field of Classification Search
CPC ......... C03C 3/066; C03C 3/093; C03C 3/112; C03C 3/115; C03C 3/118; C03C 8/04; C03C 8/06
See application file for complete search history.

(56) References Cited

U.S. PATENT DOCUMENTS

| | | | |
|---|---|---|---|
| 3,383,225 A | * | 5/1968 | Stradley .................. C03C 8/02 501/24 |
| 4,084,975 A | | 4/1978 | Faust |
| 4,493,900 A | * | 1/1985 | Nishino .................. C03C 8/06 501/25 |
| 5,306,674 A | | 4/1994 | Ruderer et al. |
| 2011/0262758 A1 | | 10/2011 | Benford, Jr. et al. |
| 2014/0302331 A1 | | 10/2014 | Benford, Jr. et al. |

FOREIGN PATENT DOCUMENTS

| | | | |
|---|---|---|---|
| DE | 195 12 847 | | 11/1996 |
| DE | 19512847 C1 | * | 11/1996 ............. C03C 3/118 |
| FR | 2 363 173 | | 3/1978 |

OTHER PUBLICATIONS

European Search Report dated Jan. 29, 2019 issued in Application No. 18196874.0.

* cited by examiner

*Primary Examiner* — Elizabeth A. Bolden
(74) *Attorney, Agent, or Firm* — Ked & Associates LLP

(57) ABSTRACT

A glass composition, a cooking appliance having a glass composition, and a method of forming a glass composition may include a glass frit including 15 wt. % to 50 wt. % silicon dioxide ($SiO_2$), 10 wt. % to 30 wt. % of diboron trioxide ($B_2O_3$), 5 wt. % to 35 wt. % of zinc oxide (ZnO), and 10 wt. % to 30 wt. % of an I-group oxide. The glass frit may further include at least one of aluminum oxide ($Al_2O_3$), zirconium dioxide ($ZrO_2$), or titanium dioxide ($TiO_2$) by about 0.1 wt. % to 5 wt. %; at least one of sodium fluoride (NaF) or aluminum trifluoride ($AlF_3$) by about 1 wt. % to 5 wt. %; and at least one of cobalt(II) dicobalt(III) oxide ($Co_3O_4$), nickel(II) oxide (NiO), iron(III) oxide ($Fe_2O_3$), or manganese(IV) oxide ($MnO_2$) by about 1 wt. % to 6 wt. %. The I-group oxide may include at least one of lithium oxide ($Li_2O$), sodium oxide ($Na_2O$), or potassium oxide ($K_2O$).

7 Claims, 2 Drawing Sheets

GLASS FRIT, GLASS COMPOSITION, COOKING APPLIANCE HAVING GLASS COMPOSITION, AND METHOD OF FORMING GLASS COMPOSITION

CROSS-REFERENCE TO RELATED APPLICATION(S)

The present application claims priority to Korean Patent Application No. 10-2017-0124098, filed on Sep. 26, 2017, the entire contents of which is incorporated herein for all purposes by this reference.

BACKGROUND

1. Field

A glass composition, a cooking appliance having a glass composition, and a method of forming a glass composition are disclosed herein.

2. Background

Enamel is a substance formed by plating glass glaze to a surface of a metal plate. Enamel is commonly used in cooking appliances, such as microwaves and ovens. Enamel may be classified into acid resistant enamel that prevents oxidation, heat resistant enamel that resists high temperatures, for example, depending on a kind and use of glaze. Further, enamel may be classified into aluminum enamel, zirconium enamel, titanium enamel, and soda glass enamel, for example, depending on materials that are added to the enamel.

In forming an enamel substance, a glass frit may be manufactured, and a glass powder may be formed by powdering the glass frit through a dry or wet process. The glass powder may then be coated on an object, forming an enamel layer. The enamel layer may further be formed by coating an object and then performing a sintering process at a predetermined temperature.

The substances of objects on which an enamel layer is formed may be limited based on a sintering temperature. As the sintering temperature increases, cost and time of the enamel forming process may also increase, reducing the efficiency of the process. Accordingly, there is a need for a glass composition that can be sintered at a reduced temperature to improve efficiency of the enamel forming process and to accommodate a variety of substances to be coated with an enamel layer.

BRIEF DESCRIPTION OF THE DRAWINGS

Embodiments will be described in detail with reference to the following drawings in which like reference numerals refer to like elements, and wherein.

DETAILED DESCRIPTION

Figure 1:
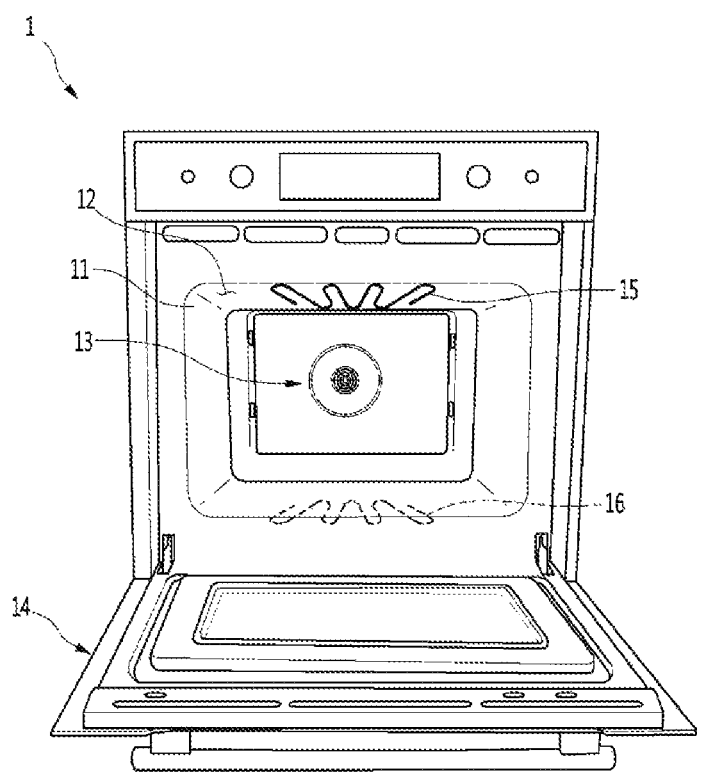
FIG. 1 is a front view of a cooking appliance according to an embodiment.

Referring to FIG. 1, a cooking appliance 1 may include a cavity 11 having a cooking chamber 12, a door 14 that selectively opens and closes the cooking chamber 12, and at least one heating source, heat source, or heater that heats an object to be cooked in the cooking chamber 12. The cavity 11 may have a hexahedral shape with an open front. The heating source may include a convection assembly or a convection heater 13 that discharges heated air into the cavity 11, a top heater 15 provided at an upper portion of the cavity 11, and a bottom heater 16 provided at a lower portion of the cavity 11. It is not necessary that the heating source include all of the convection assembly 13, the top heater 15, and the bottom heater 16. The heating source may include at least any one of the convection assembly 13, the top heater 15, and the bottom heater 16. The top heater 15 and the bottom heater 16 may be provided inside or outside the cavity 11.

Referring to FIGS. 2 to 5, a functional layer or a plurality of functional layers 11b and/or 14b may be provided on an inner side of the cavity 11 and/or a rear side of the door 14, respectively. The at least one functional layer 11b and/or 14b may include a glass composition. The at least one functional layer 11b and/or 14b may be coated on the inner side of the cavity 11 and/or the rear side of the door 14, respectively. That is, the at least one functional layer 11b and/or 14b may be a coating layer. The at least one functional layer 11b and/or 14b may improve heat resistance, chemical resistance, and/or contamination resistance of the inner side of the cavity 11 and/or the rear side of the door 14.

Figure 2:
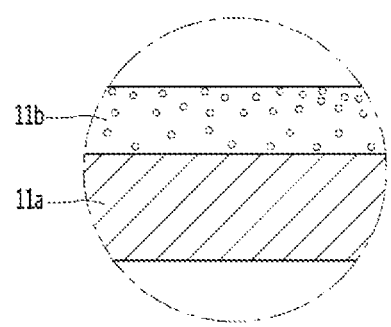
FIGS. 2 and 3 are enlarged cross-sectional views showing a portion of an inner side of a cavity of FIG. 1.
Figure 3:
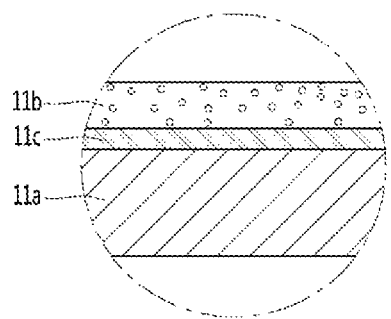

Referring to FIGS. 2 and 3, a functional layer 11b may be provided in the cavity 11. The cavity 11 may include a metal layer 11a and a functional layer 11b on the metal layer 11a. The metal layer 11a may be a base material of the cavity 11.

Figure 4:
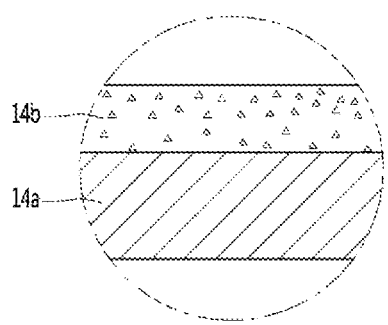
FIGS. 4 and 5 are enlarged cross-sectional views showing a portion of a rear side of a door of FIG. 1.
Figure 5:
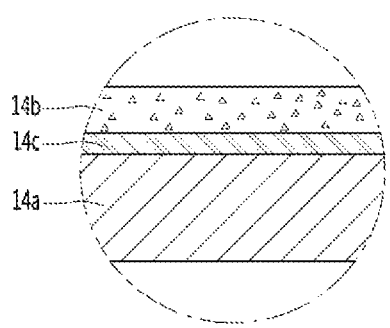

Referring to FIG. 2, the functional layer 11b may be in direct contact with or provided on or adjacent to the metal layer 11a. Referring to FIG. 3, the functional layer 11b may be in indirect contact with the metal layer 11a. A buffer layer 11c may be provided between the metal layer 11a and the functional layer 11b. The buffer layer 11c may include a bonding layer. That is, a bonding force or adhesion between the metal layer 11a and the functional layer 11b may be improved by the buffer layer 11c. Referring to FIGS. 4 and 5, a functional layer 14b may be provided on the rear side of the door 14, which may face the cooking chamber 12 when the door 14 closes the cooking chamber 12. The functional layer 14b may improve heat resistance, chemical resistance, and/or contamination resistance of the rear side of the door 14. The door 14 may include a metal layer 14a and a functional layer 14b on the metal layer 14a. The metal layer 14a may be a base material of the cavity. Referring to FIG. 4, the functional layer 14b may be in direct contact with or provided on or adjacent to the metal layer 14a. Alternatively, referring to FIG. 5, the functional layer 14b may be in indirect contact with the metal layer 14a. A buffer layer 14c may be provided between the metal layer 14a and the functional layer 14b. The buffer layer 14c may include a bonding layer. That is, a bonding force or adhesion between the metal layer 14a and the functional layer 14b may be improved by the buffer layer 14c. The at least one functional layer 11b and/or 14b may be formed by coating a glass composition on the inner side of the cavity 11 and/or the rear side of the door 14, respectively, whereby the at least one function layer 11b and/or 14b may improve heat resistance, chemical resistance, and contamination resistance of the inner side of the cavity 11 and/or the rear side of the door 14.

The glass composition according to an embodiment may include a glass frit including $SiO_2$ (silicon dioxide or silica), $B_2O_3$ (diboron trioxide or boron trioxide), ZnO (zinc oxide), and an I-group oxide (or Group I oxide or Group 1 oxide). $SiO_2$ may be included by about 50 wt. % or less of the entire glass frit. As an example, $SiO_2$ may be included by about 10 wt. % to 50 wt. % of the entire glass frit. As another example, $SiO_2$ may be included by about 15 wt. % to 50 wt. % of the entire glass frit.

$SiO_2$ may be included in the glass composition to form a glass structure of the glass composition, improve the framework of the glass structure, and improve acid resistance of the glass frit. When $SiO_2$ is included by less than about 15 wt. % of the entire glass frit, the glass structure of the glass composition may be deteriorated, reducing durability of a functional layer. When $SiO_2$ is included by more than about 50 wt. % of the entire glass frit, a sintering temperature of the glass frit may need to be increased to properly form an enamel layer.

$B_2O_3$ may be included by about 30 wt. % or less of the entire glass frit. As an example, $B_2O_3$ may be included by about 5 wt. % to 30 wt. % of the entire glass frit. As another example, $B_2O_3$ may be included by about 10 wt. % to 30 wt. % of the entire glass frit.

$B_2O_3$ may increase a vitrification area of the glass frit and may appropriately adjust the coefficient of thermal expansion of the glass composition according to an embodiment. Further, $B_2O_3$ may provide sufficient fusion flow in a sintering process of the glass frit by reducing a viscosity of the glass frit. That is, $B_2O_3$ may reduce a contact angle of the glass frit at a high temperature and may improve propagation and fluidity in a sintering process of the glass frit, so high or strong adhesion may be maintained even at a low temperature.

When $B_2O_3$ is included by less than about 10 wt. % of the entire glass frit, the vitrification area may be reduced and the glass structure may be deteriorated, reducing durability of a functional layer. When $B_2O_3$ is included by more than about 30 wt. % of the entire glass frit, the sintering temperature of the glass frit may be increased.

The I-group oxide may include at least one metallic oxide of $Li_2O$ (lithium oxide or lithia), $Na_2O$ (sodium oxide or disodium oxide), or $K_2O$ (potassium oxide or potassium oxidopotassium). For example, the I-group oxide may include all of $Li_2O$, $Na_2O$, and $K_2O$ such that the glass frit may include all of $Li_2O$, $Na_2O$, and $K_2O$. The I-group oxide may be included by about 30 wt. % or less of the entire glass frit. As an example, the I-group oxide may be included by about 5 wt. % to 30 wt. % of the entire glass frit. As another example, the I-group oxide may be included by about 10 wt. % to 30 wt. % of the entire glass frit.

The I-group oxide may reduce the sintering temperature of the glass frit when included in the glass composition. The I-group oxide may sufficiently reduce thermal properties of the glass composition such that the glass composition may be sintered at a low temperature. When the I-group oxide is included by less than about 10 wt. % of the entire glass frit, the sintering temperature of the glass composition may be be reduced. When the I-group oxide is included by more than about 30 wt. % of the entire glass frit, the coefficient of thermal expansion of the glass composition may be increased such that a bonding force between the coating layer and the base material may decrease due to a difference in the coefficients of thermal expansion of the base material and the glass composition.

ZnO may be included by about 35 wt. % or less of the entire glass frit. As an example, ZnO may be included by about 2 wt. % to 35 wt. % of the entire glass frit. As another example, ZnO may be included by about 5 wt. % to 35 wt. % of the entire glass frit.

ZnO may reinforce the glass structure of the glass composition when included in the glass composition. ZnO may function as a network intermediate or an intermediate that maintains balance between $SiO_2$ and the I-group oxide. ZnO may maintain balance between $SiO_2$ and $B_2O_3$, which may each function as a network former, and the I-group oxide, which may function as a network modifier. When ZnO is included by less than about 5 wt. % of the entire glass frit, the glass structure of the glass composition may deteriorate, reducing durability of a functional layer. When ZnO is included by more than about 35 wt. % of the entire glass frit, crystallization of glass may occur.

The glass frit may further include at least one of $Al_2O_3$ (aluminum oxide or alumina), $ZrO_2$ (zirconium dioxide or zirconia), or $TiO_2$ (titanium dioxide or titania). For example, the glass frit may include all of $Al_2O_3$, $ZrO_2$, and $TiO_2$. At least one of $Al_2O_3$, $ZrO_2$, or $TiO_2$ may be included by about 5 wt. % or less of the entire glass frit. As an example, at least one of $Al_2O_3$, $ZrO_2$, or $TiO_2$ may be included by about 0.1 wt. % to 5 wt. % of the entire glass frit.

$Al_2O_3$ and $ZrO_2$ may improve chemical resistance and durability of the glass frit when included in the glass frit. $Al_2O_3$ and $ZrO_2$ may supplement low chemical durability of an alkali phosphated glass structure formed by $Na_2O$ and $K_2O$ through structural stabilization. $TiO_2$ may improve a hiding power or opacity of the glass composition according to an embodiment. That is, the hiding power of the coating layer of a glass composition on the functional layers may be improved by $TiO_2$.

When $Al_2O_3$, $ZrO_2$, and $TiO_2$ are included by less than about 0.1 wt. % of the entire glass frit, chemical resistance and durability of the glass composition may be reduced and the hiding power of the glass composition may be deteriorate or decrease such that when the glass composition is coated on a buffer layer, a color of the buffer layer may be visible or shown to an outside. When $Al_2O_3$ and $ZrO_2$ are included by more than about 5 wt. % of the entire glass frit, the sintering temperature of the glass frit may be increased, and accordingly, the process efficiency may be decreased through increased costs and time.

The glass frit may further include a fluorine compound. The fluorine compound may be selected from NaF (sodium fluoride) or $AlF_3$ (aluminum trifluoride or aluminum fluoride). For example, the fluorine compound may include NaF and $AlF_3$. That is, the glass frit may include all of NaF and $AlF_3$. The fluorine compound may appropriately adjust a surface tension of a coating film formed by the glass composition. Further, the vitrification area of the glass frit may be increased by the fluorine compound. The fluorine compound may be included by about 5 wt. % or less of the entire glass frit. As an example, the fluorine compound may be included by about 0.1 wt. % to 5 wt. % of the entire glass frit. As another example, the fluorine compound may be included by about 1 wt. % to 5 wt. % of the entire glass frit.

When the fluorine compound is included by less than about 1 wt. % of the entire glass frit, the vitrification area may be reduced and the glass structure may deteriorate, reducing durability of a functional layer. When the fluorine compound is included by more than about 5 wt. % of the entire glass frit, the sintering temperature of the glass frit may increase.

The glass frit may include at least one of $Co_3O_4$ (cobalt(II) dicobalt(III) oxide or cobalt (II, III) oxide or cobalt oxide), NiO (nickel(II) oxide or nickel monoxide), $Fe_2O_3$ (iron(III) oxide or ferric oxide), or $MnO_2$ (manganese dioxide or manganese(IV) oxide). The glass frit may further include all of $Co_3O_4$, NiO, $Fe_2O_3$, and $MnO_2$. $Co_3O_4$, NiO, $Fe_2O_3$, and $MnO_2$ may increase adhesion or bonding of the glass composition that is coated on a base material. That is, $Co_3O_4$, NiO, $Fe_2O_3$, and $MnO_2$ may be adhesion-reinforcing elements that improve adhesion when a glass composition is coated on a base material. By $Co_3O_4$, NiO, $Fe_2O_3$, and $MnO_2$, adhesion may be improved even if the glass composition is directly coated on a base material without a specific buffer layer. Accordingly, the entire thicknesses of the cavity 11 and/or the door 14 on which the glass composition of the functional layer 11b and/or 14b is coated may be reduced, improving efficiency of the process. $Co_3O_4$, NiO, $Fe_2O_3$, and $MnO_2$ may be included by about 6 wt. % or less of the entire glass frit. As an example, $Co_3O_4$, NiO, $Fe_2O_3$, and $MnO_2$ may be included by about 1 wt. % to 6 wt. % or less of the entire glass frit.

Embodiments are described with respect to a method of producing glass compositions according to embodiments and comparative examples. These embodiments are only examples. Accordingly, embodiments are not limited to the disclosed embodiments.

Embodiment 1

As shown in the following Table 1, a glass frit material was provided.

$Na_2CO_3$ (sodium carbonate), $K_2CO_3$ (potassium carbonate or dipotassium carbonate), $Li_2CO_3$ (lithium carbonate or dilithium carbonate) were used as the raw materials of $Na_2O$, $K_2O$, and $Li_2O$; and the other elements were the same as those shown in Table 1. The glass frit material was mixed, melted at about 1400° C. for one to two hours, and then rapidly quenched or cooled by a quenching roller, thereby obtaining a glass cullet.

Organopolysiloxane of about 0.1 wt. % to 1 wt. % was put into the glass cullet, milled and pulverized by a ball mill for about 6 hours, and then put through a 325-mesh sieve to have a particle diameter of about 45 μm or less, thereby producing a glass frit. The glass frit was sprayed to a low-carbon steel sheet of 200×200 (mm) and 1 (mm) thickness by a corona discharge gun. The voltage of the discharge gun was controlled between 40 to 100 kV and the amount of the glass frit sprayed onto the low-carbon steel sheet was 300 g/m².

A functional layer was formed on a side of the low-carbon steel by sintering the low-carbon steel sheet with the glass frit sprayed thereon at about 700° C. to 750° C. for about 300 to 450 seconds, and then adhesion of the functional layer was measured. The adhesion test device was Dupont Impact Tester (ASTM D1794, JIS K5400), in which a sample was put on the center of a sample stage, a steel ball having a diameter of about 25.4 mm (1 inch) was put on the center of the plane of the sample, and then a weight of 2 kg was freely dropped from a height of 300 mm, thereby examining the state of peeling.

The reference for determining adhesion levels was as follows:

[Adhesion Level]
Level 0=No adhesion
Level 1=Very low adhesion
Level 2=Having adhesion
Level 3=Good adhesion
Level 4=High adhesion
Level 5=Highest adhesion Further, a pellet type specimen was sintered under the same conditions as those for sintering the glass frit to measure thermal properties of glass, and both sides of the specimen was ground and then a softening temperature Td and a coefficient of thermal expansion CTE were measured at a temperature rising speed of 10° C./min by a Thermo Mechanical Analyzer, or TMA.

Embodiment 2

As shown in Table 1, a functional layer was formed in the same way as Embodiment 1 except that glass frit materials were provided as given in the respective column of Table 1. Adhesion, softening temperature, and a coefficient of thermal expansion of the functional layer were measured, as shown in Tables 2-3.

Comparative Example 1

As shown in Table 1, a functional layer was formed in the same way as Embodiment 1 except that glass frit materials were provided as given in the respective column of Table 1. Adhesion, softening temperature, and a coefficient of thermal expansion of the functional layer were measured, as shown in Tables 2-3.

Comparative Example 2

As shown in Table 1, a functional layer was formed in the same way as Embodiment 1 except that glass frit materials were provided as given in the respective column of Table 1. Adhesion, softening temperature, and a coefficient of thermal expansion of the functional layer were measured, as shown in Tables 2-3.

TABLE 1

| Component (wt. %) | Embodiment 1 | Embodiment 2 | Comparative example 1 | Comparative example 2 |
| --- | --- | --- | --- | --- |
| $SiO_2$ | 22.43 | 30.93 | 53.95 | 60.32 |
| $B_2O_3$ | 24.79 | 26.79 | 13.86 | 12.29 |
| $Na_2O$ | 11.48 | 10.08 | 17.25 | 13.25 |
| $K_2O$ | 5.8 | 7.7 | — | — |
| $Li_2O$ | 2.26 | 1.86 | 1.0 | 1.8 |
| $Al_2O_3$ | 0.5 | — | — | 0.1 |
| $ZrO_2$ | — | — | 2.2 | 2.2 |
| $TiO_2$ | — | 1 | 2.1 | 2.2 |
| ZnO | 24.79 | 14.29 | — | — |
| CaO | — | — | 3.02 | 1.53 |
| NaF | 3.23 | 3.6 | 1.8 | 2.2 |
| $Co_3O_4$ | 3.74 | 2.42 | 1.3 | 1.6 |
| NiO | 1.48 | 2.3 | 2.31 | 1.3 |
| $MnO_2$ | — | — | 1.2 | 1.4 |

TABLE 2

| | Embodiment 1 | Embodiment 2 | Comparative example 1 | Comparative example 2 |
| --- | --- | --- | --- | --- |
| Softening temperature (° C.) | 491.22 | 512.29 | 564.3 | 593.1 |
| Coefficient of thermal expansion($\times 10^{-7}$/° C.) | 104.5 | 109.9 | 105.3 | 85.2 |

TABLE 3

| | Embodiment 1 | Embodiment 2 | Comparative example 1 | Comparative example 2 |
| --- | --- | --- | --- | --- |
| Adhesion | 3~4 | 3~4 | 0 | 0 |

Referring to Table 2, it can be seen that the functional layers formed by the glass frits according to Embodiments 1 and 2 have high softening temperatures and coefficients of thermal expansion. That is, the functional layers of Embodiments 1 and 2 have a softening temperature of about 500° C. and a coefficient of thermal expansion of 100 ($10^{-7}$/° C.) or more. That is, it can be seen that the functional layers formed by the glass frit compositions according to Embodiments 1 and 2 result in an improved durability and chemical resistance compared to the compositions of Comparative Examples 1 and 2.

Further, it can be seen that the functional layers formed by the glass frits according to Embodiments 1 and 2 have improved adhesion. That is, referring to Table 3, it can be seen that the glass frits according to Embodiments 1 and 2 have improved adhesion on a low-carbon steel even at a sintering temperature of 700° C. to 750° C.

The glass frits according to the embodiments may have a low sintering temperature when they are coated on a low-carbon steel sheet. For example, the glass frits according to the embodiments may be sintered at about 700° C. to 750° C. after spray-coated on a low-carbon steel sheet. That is, the glass frits according to the embodiments may form a functional layer on a low-carbon steel sheet by being sintered at about 700° C. to 750° C. and may have a coefficient of thermal expansion, a softening temperature, and adhesion better than those of different functional layers. Therefore, the glass frits according to the embodiments may be coated on a low-carbon steel sheet by sintering at a low temperature, decreasing a temperature of the process while increasing an efficiency of the process.

Embodiments disclosed herein provide a glass composition having a low sintering temperature. A glass composition according to an embodiment may include a glass frit including $SiO_2$, $B_2O_3$, ZnO, and an I-group oxide, in which the $SiO_2$ is included by 15 wt. % to 50 wt. % of the entire glass frit, the $B_2O_3$ is included by 10 wt. % to 30 wt. % of the entire glass frit, the ZnO is included by 5 wt. % to 35 wt. % of the entire glass frit, and the I-group oxide is included by 10 wt. % to 30 wt. % of the entire glass frit.

The glass frit according to an embodiment may have a low sintering temperature when it is coated on a low-carbon steel sheet. The glass frit may be sintered at 700° C. to 750° C. after it is spray-coated on a low-carbon steel sheet. That is, the glass frit may form a functional layer on a low-carbon steel sheet by being sintered at 700° C. to 750° C., and may have a coefficient of thermal expansion, a softening temperature, and an adhesion similar to those of a functional layer that may be coated in a high-temperature process.

Therefore, the glass frit may be coated on a low-carbon steel sheet by sintering at a low temperature such that a process temperature may be decreased while a process efficiency may be improved. Further, since the glass frit may be sintered at a low temperature, it may be coated on various materials such as aluminum and SUS (stainless use steel, or stainless steel), which can be sintered at a low temperature, so it is therefore possible to use the glass frit on a variety of base materials.

Although embodiments were described above with reference to embodiments, the embodiments are only examples and do not limit the embodiments, and those skilled in the art would know that embodiments disclosed herein may be changed and modified in various ways not exemplified above without departing from the scope. For example, the components described in detail in the embodiments may be modified. Further, differences relating to the changes and modifications should be construed as being included in the scope which is determined by claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A glass frit, comprising:
   silicon dioxide ($SiO_2$) by 15 wt. % to 50 wt. % of the glass frit;
   diboron trioxide ($B_2O_3$) by 10 wt. % to 30 wt. % of the glass frit;
   zinc oxide (ZnO) by 5 wt. % to 35 wt. % of the glass frit;
   an I-group oxide by 10 wt. % to 30 wt. % of the glass frit;
   at least one of sodium fluoride (NaF) or aluminum trifluoride ($AlF_3$), the total amount of NaF and $AlF_3$ being in a range of 1 wt % to 5 wt % of the entire glass frit;
   at least one of aluminum oxide ($Al_2O_3$), zirconium dioxide ($ZrO_2$), or titanium dioxide ($TiO_2$), the total amount of the $Al_2O_3$, $ZrO_2$, and $TiO_2$ being included in a range of 0.1 wt % to 5 wt % of the entire glass frit; and
   at least one of cobalt(II) dicobalt(III) oxide ($Co_3O_4$), nickel(II) oxide (NiO), iron(III) oxide ($Fe_2O_3$), or manganese(IV) oxide ($MnO_2$), the total amount of the $Co_3O_4$, NiO, $Fe_2O_3$ and $MnO_2$ being included in a range of 1 wt % to 6 wt % of the entire glass frit.

2. The glass frit of claim 1, wherein the I-group oxide includes at least one of lithium oxide ($Li_2O$), sodium oxide ($Na_2O$), or potassium oxide ($K_2O$).

3. The glass frit of claim 2, further including calcium oxide (CaO).

4. A glass composition including the glass frit of claim 1.

5. A cooking appliance including the glass composition of claim 4.

6. A cooking appliance, including:
   a cavity having a cooking chamber;
   a door that opens and closes the cooking chamber; and
   at least one heater that heats an object provided in the cooking chamber, wherein at least one of the cavity or the door includes a metallic base material including low-carbon steel and a functional layer on the metallic base material, the functional layer including a glass frit according to claim 1.

7. The cooking appliance of claim 6, wherein the I-group oxide includes at least one of lithium oxide ($Li_2O$), sodium oxide ($Na_2O$), or potassium oxide ($K_2O$).

* * * * *